United States Patent [19]

Sakaya et al.

[11] Patent Number: 5,430,566
[45] Date of Patent: Jul. 4, 1995

[54] LIQUID CRYSTAL DEVICE WITH PHASE RETARDER HAVING LAYERED INORGANIC COMPOUND

[75] Inventors: Taiichi Sakaya; Toshiya Kuroda; Koji Higashi, all of Takatsuki; Tadashi Shindo, Toyonaka; Akiko Shimizu, Ibaraki, all of Japan

[73] Assignee: Sumitomo Chemical Company, Limited, Osaka, Japan

[21] Appl. No.: 185,328

[22] Filed: Jan. 19, 1994

Related U.S. Application Data

[63] Continuation of Ser. No. 971,473, Nov. 4, 1992, abandoned.

[30] Foreign Application Priority Data

Nov. 8, 1991 [JP] Japan .................... 3-292804
Mar. 31, 1992 [JP] Japan .................... 4-077138

[51] Int. Cl.⁶ .................... G02B 5/30; G02F 1/1335
[52] U.S. Cl. .................... 359/73; 359/500
[58] Field of Search .................... 359/73, 63, 65, 490, 359/492, 499, 500, 495, 494, 253; 428/323, 324, 325, 331, 357, 363

[56] References Cited

U.S. PATENT DOCUMENTS

| | | | |
|---|---|---|---|
| 2,123,901 | 7/1938 | Land | 359/500 |
| 2,123,902 | 7/1938 | Land | 359/500 |
| 2,256,108 | 9/1941 | Blake | 359/492 |
| 4,536,063 | 8/1985 | Southwell | 359/488 |
| 4,677,188 | 6/1987 | Utsumi et al. | 428/480 |
| 4,693,932 | 9/1987 | Kuze et al. | 428/323 |
| 4,701,028 | 10/1987 | Clerc et al. | 359/65 |
| 4,844,569 | 7/1989 | Wada et al. | 359/73 |
| 4,983,432 | 1/1991 | Bissot | 428/324 |
| 5,093,041 | 3/1992 | Check, III et al. | 359/253 |
| 5,113,285 | 5/1992 | Franklin et al. | 359/465 |
| 5,142,393 | 8/1992 | Okumura et al. | 359/73 |
| 5,305,143 | 4/1994 | Taya et al. | 359/490 |

FOREIGN PATENT DOCUMENTS

| | | |
|---|---|---|
| 0239433 | 9/1987 | European Pat. Off. |
| 0297841 | 1/1989 | European Pat. Off. |
| 0366803 | 5/1990 | European Pat. Off. |
| 60-256121 | 12/1985 | Japan |
| 385519 | 8/1989 | Japan |
| 215239 | 1/1990 | Japan |
| 2191904 | 7/1990 | Japan |
| 2285303 | 11/1990 | Japan |
| 330944 | 2/1991 | Japan |
| 3132720 | 6/1991 | Japan |
| 3141322 | 6/1991 | Japan |
| 1462978 | 1/1977 | United Kingdom |

OTHER PUBLICATIONS

"Electroptic Birefringence and Scattering of Hectorile Suspensions", Brown et al, pp. 2019-2023, Applied Optics, Oct. 1969, vol. 8, No. 10.
Kato et al, "Development and Application of Interalary Compounds", 1985, CMC Co.
Applied Optics, vol. 28, No. 13, 1 Jul. 1989, pp. 2466-2482.
Patent Abstracts of Japan, vol. 15, No. 262, 3 Jul. 1991.

*Primary Examiner*—William L. Sikes
*Assistant Examiner*—Kenneth Parker
*Attorney, Agent, or Firm*—Sughrue, Mion, Zinn, Macpeak & Seas

[57] ABSTRACT

A liquid crystal device with a compensator made of a layered inorganic compound sheet or film in which a refractive index in the plane and a refractive index in the thickness direction are different from each other. The layered inorganic compound may be smectite group minerals. The layered inorganic compound has a mean particle size of 500 nm or less. The phase retarder is employed in a liquid crystal device.

4 Claims, 1 Drawing Sheet

— CR=15  — — CR=10  - - - CR=5  — · — CR=1

— CR=15  — — CR=10  - - - CR=5  — · — CR=1

LIQUID CRYSTAL DEVICE WITH PHASE RETARDER HAVING LAYERED INORGANIC COMPOUND

This is a Continuation of application Ser. No. 07/971,473 filed Nov. 4, 1992, now abandoned.

BACKGROUND OF THE INVENTION

1. Field of the Invention

The present invention relates to a phase retarder.

2. Description of the Related Art

Phase retarders comprising a uniaxially oriented polymer film have been used as optical compensators to enhance display qualities of liquid crystal display devices.

A STN type liquid crystal display device using such phase retarders as compensators is advantageous in that it can be lighter in weight, thinner and less expensive, but disadvantageous in that it has narrow viewing angle characteristics and exhibits a low contrast ratio compared to a STN double cell type liquid crystal display device using a liquid crystal cell as optical compensators.

The STN type device has been considerably improved to alleviate its poor contrast by laminating two plies of phase retarders, but they are still unsatisfactory for the viewing angle characteristics.

The viewing angle characteristics of the liquid crystal display devices using the phase retarders as optical compensators are greatly depending upon the viewing angle characteristics of the phase retarders themselves. The viewing angle characteristics of the phase retarders comprising uniaxially oriented polymer films can be evaluated by using a viewing angle.

The viewing angle of phase retarders is defined as a tilt angle ($\theta_{1.10}$) of a film relative to a normal direction when a ratio of the retardation (R) observed for the tilted film to the retardation ($R_0$) observed for the normally disposed film is 1.10 with the film being tilted by rotating around an axis which is corresponding to the slow axis of the film having a positive birefringent anisotropy, or to the fast axis of the one having a negative birefringent anisotropy where the observation is performed under a polarizing microscope equipped with Senarmont compensator. The higher the viewing angle, the better the viewing angle characteristics.

As techniques for enhancing the viewing angle, there have been proposed several methods such as a method of shrinking the film in the direction perpendicular to the stretching direction at the time of stretching as disclosed in Japanese Patent KOKAI (Laid-open) No. 2-191904; a method of controlling the birefringent properties of a raw film, which has been produced from a molten polymer or a polymer solution under an electric field applied, by stretching as disclosed in Japanese Patent KOKAI (Laid-open) No. 2-285303; and a method of laminating a film, which has been produced under an electric field applied, on a conventional phase retarder as disclosed in Japanese Patent KOKAI (Laid-open) No. 3-85519. However, any one of those methods can hardly be said to be prominent in mass producibility.

Furthermore, in order to improve display characteristics such as contrast, color and viewing angle properties and the like, there have been developed various liquid crystal display schemes other than the STN type, for example, a TN liquid crystal display having a birefringent optical compensating layer as disclosed in G.B. Patent No. 1462978 and a homeotropic liquid crystal display scheme having a birefringence compensating layer as disclosed in Japanese Patent KOKAI (Laid-open) No. 2-15239. However, these liquid crystal displays require as optical compensator a phase retarder comprising a film having a non-anisotropic refractive index in the film plane ($R_0=0$) and a refractive index different therefrom in the thickness direction normal to the plane.

SUMMARY OF THE INVENTION

The present inventors have made an extensive research for overcoming the problems as described above. As a result, it has been discovered that the use of a layered inorganic compound enables production of a novel phase retarder having an excellent performance. The present invention has been resulted from an addition of various improvements to the discovery.

The present invention is to provide a novel phase retarder characterized by comprising a layered inorganic compound film or sheet having an in-plane refractive index and a refractive index different therefrom in the thickness direction.

DESCRIPTION OF THE PREFERRED EMBODIMENTS

Figure 1:
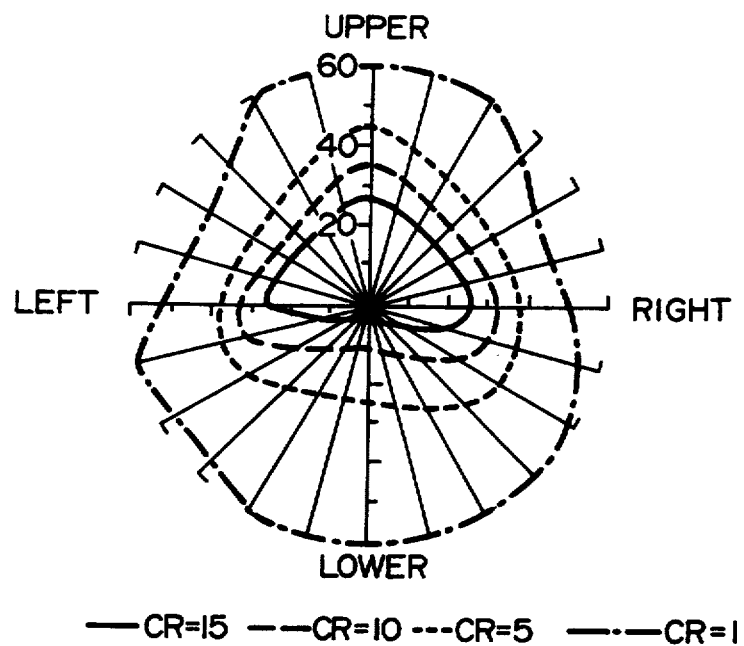
FIG. 1 is a chart showing iso-contrast curves representing the viewing angle characteristics of the FTN type LCD using the phase retarders of Examples according to the present invention.

The layered inorganic compounds to be used in the present invention are such that they have a stratified structure with a plurality of crystalline layer units being stacked on one another and can be intercalated with ions or molecules, which are introduced between the crystalline layer units, by various physical or chemical procedures without destructing the structure of the crystalline layer unit because of the relatively weak strength of bonding between the crystalline layer units, and that they have such refractive index properties that the refractive index in the plane of the crystalline layer unit is different from the refractive index in the thickness direction.

The layered inorganic compounds as above are described by T. Kato and I. Kuroda in the publication "Development and Application of intercalary compounds" (published by CMC Co. Ltd., 1985) where layered inorganic compounds are referred to, for example, including clay minerals, chalcogen compounds, zirconium phosphate compounds, oxyacid salts of transition metals, layered polysilicates, metal oxyhalogenides, and intercalary decoration thereof intercalated with ions or molecules between the crystalline layer units. When layered inorganic compounds having a higher refractive index in the plane of the crystalline layer unit than that in the thickness direction are used, layered inorganic compound sheets or films comprising layered inorganic compounds can be easily obtained. Clay minerals can be preferably employed in the present invention. The clay minerals may be classified into two types:

The first type is such that the crystalline layer unit is composed of a two-layer structure having a layer of silica tetrahedrons and a layer of octahedrons with central metal of aluminum, magnesium or the like formed thereon. The second type is such that the crystalline layer unit is composed of a three-layer structure having a layer of octahedrons with central metal of aluminum, magnesium or the like sandwiched between two silica tetrahedron layers. The first type includes kaolinite group, antigorite group, while the second type includes smectite group, vermiculite group, and mica group.

Practical clay minerals include kaolinite, dickite, nacrite, halloysite, antigorite, chrysotile, prophyllite, montmorillonite, hectorite, sodium tetrasiliric mica, sodium tenorite, muscovite, margarite, talc, vermiculite, phlogopite, xanthophyllite, and chlorite.

Among the clay minerals, chemically synthesized sodium tetrasiliric mica containing less impurities and smectite group are preferred for excellent transparency. Exemplary smectite group materials include montmorillonite, beidellite, nontronite, saponite, hectorite, sauconite, and chemically synthesized products having a similar crystalline structure.

The layered inorganic compounds which have been swollen or dispersed, for example, in the form of dispersion or gel are formed into film by solvent casting or coating on a releasable substrate, for example, on a polyester film having a surface treated with a releasing agent and by peeling off after drying, whereby a layered inorganic compound sheet or film comprising layered inorganic compounds having less anisotropic in-plane refractive index which is different from the reflective index in the thickness direction can be easily produced. The resultant sheets or films can be used as phase retarders in the present invention.

Solvents to be used for swelling or dispersing the layered inorganic compounds should be those which can swell the interlayer space between the crystalline layer units of the layered inorganic compounds, and among them, preferred ones are those capable of swelling the interlayer space to such an extent as exhibiting a colloidal state. Exemplary solvents which can be used for the clay minerals not decorated with organic materials between the crystalline layer units are dimethylformamide, dimethyl sulfoxide, nitromethane, water, methanol and ethylene glycol.

In order to achieve a good transparency after film formation, such layered inorganic compounds containing no impurity and having a mean particle size of 5000 nm or less as determined by a dynamic light scattering method, inter alia, clay minerals should be preferably used. More preferred mean particle size is in the range of 1000 nm to 10 nm. The synthetic smectite group materials, mean particle size of which is controlled in the range of visible light wave length or less are preferred, inter alia, synthetic hectorite group materials are preferred.

In production of the phase retarders using the layered inorganic compound sheets or films according to the present invention, a mixture of the layered inorganic compounds with an optically transparent resin is preferred because film formability, mechanical properties and durability are improved.

The optically transparent resins to be used for the mixture are, but not limited to, any one selected from hydrophobic resins and hydrophilic ones as desired depending upon the type of layered inorganic compounds. Such resins may be used alone or in a blend of a plurality of them, and inclusion of a resin additive can be acceptable, if small amount.

The ratio of the layered inorganic compounds to the optically transparent resins is not critical, though the ratio of the layered inorganic compounds to the optically transparent resins by volume is preferably in the range of 0.1 to 10 in view of enhancing film formability and mechanical properties such as crack resistance of the layered inorganic compound sheets or films.

Procedure for forming films from a mixture of the layered inorganic compounds and the optically transparent resins is not critical, so long as the interlayer space between the crystalline layer units of the layered inorganic compounds is expanded after the film formation to attain a structure where the resin molecules occupy the interlayer space between the crystalline layer units.

For example, one may make mention of a method comprising the steps of heat-kneading the layered inorganic compounds and the optically transparent resins, extruding the resultant mixture to form the sheets; a method comprising the steps of mixing a layered inorganic compound which has been swollen or dispersed in a solvent, for example, a dispersion or gel, with the optically transparent resins, and extruding the resultant mixture to form films; and a method comprising the steps of mixing a layered inorganic compound which has been swollen or dispersed in a solvent with a solution of the optically transparent resins dissolved therein and casting or coating the resultant uniform mixture on a substrate to produce films. Among them, preferred is the method where a dispersion of the layered inorganic compounds in a solvent and a solution of the optically transparent resins dissolved are mixed to form a uniform mixture which is cast or coated to produce films.

When a clay mineral is used as layered inorganic compound, the hydrophilic resins to be used include nonionic hydrophilic resins such as vinyl alcohol polymers, for example, polyvinyl alcohol, ethylene-vinylalcohol copolymers, partially saponified polyvinyl acetate, cellulose polymers, for example, cellulose, hydroxyethyl cellulose, carbomethoxy cellulose, polyvinylpyrrolidone, polyhydroxyethyl methacrylate, polyacrylamide, and polyethylene glycol; cationic hydrophilic resins such as polyethyleneimine, polyallylamine, N-type-alkylated polyvinylpyridine, and chitosan; anionic hydrophilic resins such as polyacrylic acid, sodium polyacrylate, polystyrene sulfonate, and sodium polystyrene sulfonate.

For enhancement of the film formability and the mechanical properties such as crack resistance of the layered inorganic compound sheets or films, the use of non-ionic hydrophilic resins, inter alia, polyvinylalcohol polymers is preferred, and polyvinylalcohols having a degree of saponification of 70% or more and a degree of polymerization of 200 to 1800 are most preferably excellent in mixability with clay minerals as well as in transparency after the film formation.

The mixture of the layered inorganic compounds and the optically transparent resins may cause an orientation of the optically transparent resins at the time of the film formation resulting in generation of birefringence, but the in-plane retardation should be preferably controlled to a value of 50 nm or less.

The phase retarders comprising the layered inorganic compound sheets or films according to the present invention may be formed on a transparent substrate having no or a very small in-plane birefringence to produce a phase retarder in the form of a sheet or a film deposited on the transparent substrate.

The transparent substrates to be used should have an excellent transparency in the visible light range, but have no in-plane birefringence or very small in-plane birefringence. For example, they should have a in-plane retardation of 50 nm or less and optical uniformity, and be capable of forming optically uniform sheets or films from a dispersion or gel obtained by swelling or disperse the layered inorganic compounds.

The transparent substrates as above include clean glass substrates, transparent resin substrates produced by a film-casting process, and surface-saponified cellulose base films, inter alia, the surface-saponified cellulose base films are preferred.

At techniques for laminating the transparent substrate and the phase retarder of the layered inorganic compound sheet or film according to the present invention, there may be mentioned a method comprising the steps of forming the film on a releasable substrate such as polyester films, the surfaces of which have been treated with silicone, or stainless steel plates processed with fluorine, then peeling the layered inorganic compound film from the substrate, and laminating the film onto one of various substrates with an adhesive or a sticking agent; a method comprising the steps of casting a layered inorganic compound which has been swollen or dispersed, for example, a dispersion or a gel on a transparent substrate to form a film deposited on the substrate; a method comprising the steps of mixing a layered inorganic compound which has been swollen or dispersed, for example, a liquid dispersion or a gel with a solution of the optically transparent resin dissolved to produce a uniform mixture, and casting the mixture to form a film; and a method comprising the step of extruding a layered inorganic compound on one of various transparent substrates to produce a laminate. Among them, the method comprising the steps of mixing uniformly a liquid dispersion obtained by swelling or dispersing a layered inorganic compound in a solvent with a solution of an optically transparent resin dissolved to produce a dispersion which is made into a film by a casting or coating process is preferred.

The phase retarders comprising the layered inorganic compound film or sheet according to the present invention can be used alone or in the form of a laminate on an optically transparent sheet or film which have no birefringent anisotropy in the plane. They can be preferably employed in the liquid crystal display devices of the type requiring an optical compensator, in which the in-plane refractive index and the refractive index in the thickness direction are different from each other.

The phase retarders comprising the layered inorganic compound film or sheet according to the present invention can be made those having a good viewing angle property by laminating on a birefringent film having a negative birefringent anisotropy.

The birefringent films having a negative birefringent anisotropy can be easily obtained by stretching a film of a resin having a negative intrinsic birefringence. The stretching can be performed by any one of conventional techniques such as tentering, stretching between rolls, and rolling, and the like, so long as it allows uniformity in retardation to attain.

As laminating techniques, one can employ similar methods to those for laminating on the transparent substrate as described above.

There are known various resins having negative intrinsic birefringence. Vinyl resins having high dielectric constant substituents in side chains are preferred, inter alia, aromatic vinyl resins and acrylic resins are more preferred because they are excellent in optical properties.

Practical examples of such resins include polystyrenes, poly-α-methylstyrene, polyvinylpyridine, polyvinyl naphthalene, and polymethyl methacrylate.

The phase retarders obtained in this way have an excellent viewing angle properties and can be used as optical compensator in the liquid crystal display devices of the type requiring the wide viewing angle.

Process for attaching the present phase retarders onto the liquid crystal display devices is not critical and may be conducted as by applying a sticking agent to one side or both sides of the phase retarder, and attaching adhesively the phase retarder onto a liquid crystal cell and/or a polarizer. Either side of the phase retarder may be disposed on the side of the liquid crystal cell. The phase plate may be disposed between the front polarizer and the liquid crystal cell, or between the rear polarizer and the liquid crystal.

The phase retarders of the present invention can be easily produced and used alone or in combination with other films and the like for improving the display properties of various liquid crystal display devices.

For example, the phase retarders comprising the layered inorganic compounds sheets or films according to the present invention can be used as compensators in the TN type liquid crystal display devices which comprises:

a liquid crystal cell containing nematic liquid crystal molecules having a positive dielectric anisotropy where the molecules are placed between two transparent substrates each having an electrode parallelly disposed in the manner as both electrodes being facing to each other and are oriented with their longitudinal axis being parallel to the transparent substrates and twisted as a whole at an angle of 80° to 100° relative to the direction perpendicular to the transparent substrate when no voltage is applied;

a pair of linear polarizers which are disposed on the outer sides of the liquid crystal cell; and compensator layer disposed at least one place between the liquid crystal cell and the linear polarizers.

Alternatively, a combination of the phase retarder comprising the layered inorganic compound sheet or film with a uniaxially oriented birefringent film comprising a thermoplastic resin having a negative birefringent anisotropy can be used as compensator in the STN type liquid crystal display device which comprises:

a liquid crystal cell containing nematic liquid crystal molecules having a positive dielectric anisotropy where the molecules are placed between two transparent substrates each having an electrode parallelly disposed in the manner as both electrodes being facing to each other and are oriented with their longitudinal axis being parallel to the transparent substrates and twisted as a whole at an angle of 180° to 270° relative to the direction perpendicular to the transparent substrate when no voltage is applied;

a pair of linear polarizers which are disposed on the outer sides of the liquid crystal cell; and a compensator layer disposed at least one place between the liquid crystal cell and the linear polarizers. Such TN and STN type liquid crystal displays are also described in U.S. Pat. No. 5,061,042.

The present invention will be illustrated with reference to the following Examples without limiting thereto. The mean particle sizes in the following Examples were determined with BI-90 Particle Sizer available from Brookhaven Instruments Corporation.

EXAMPLE 1

Polystyrene film (HR sheet available from DAINIPPON INK & CHEMICALS INC.) was milled to produce a 15% solution of dichloroethane which was cast into a film. This film was stretched 2.8 times by tentering at 135° C. resulting in a birefringent film having an in-plane retardation $(R_0)=512$ nm, $\theta_{1.10}=35°$, and a thickness of 28 $\mu$m. This film was corona-discharged with a corona-discharge apparatus (MM Electrode type corona-discharge test machine available from Softal Electronic Gmbh) under conditions of a discharge energy of 400 W.min./m$^2$ to achieve a surface tension of 54 dyn/cm or more, and then applied with a 1% aqueous dispersion of a clay mineral, i.e., synthetic smectite particles (available from KUNIMINE KOGYO under the tradename, SMECTON SA) having a mean particle size of 108 nm, and dried at about 28° C. for 12 hours to produce a phase retarder comprising a birefringent polystyrene film having the synthetic smectite layer of a thickness of 3.8 $\mu$m laminated thereon. This phase retarder exhibited a wide viewing angle of $\theta_{1.10}=59°$ with in-plane retardation value $R_0=512$ nm.

EXAMPLE 2

A cast polystyrene film produced in the same procedure as in Example 1 was stretched 2.8 times at 135° C. by tentering to attain a birefringent film having a thickness of 28 $\mu$m and exhibiting $\theta_{1.10}=35°$ with $R_0=503$ nm. This film was corona-discharged under the same conditions as in Example 1 to achieve a surface tension of 54 dyn/cm or more, and then applied with a 2% aqueous dispersion of a clay mineral, i.e., synthetic hectorite particles (available from Laporte Co. under the tradename, Laponite XLG) having a mean particle size of 35 nm, and dried at about 28° C. for 12 hours to produce a phase retarder comprising a birefringent polystyrene film having the synthetic hectorite layer of a thickness of 10 $\mu$m laminated thereon. This phase retarder exhibited a wide viewing angle of $\theta_{1.10}=80°$ or more with $R_0=506$ nm.

EXAMPLE 3

To a triacetyl cellulose film having a thickness of 80 $\mu$m (available from Fuji Photo Film Co. Ltd. under the tradename, FUJITACK CLEAR), the surfaces of which were treated by saponification, having an in-plane retardation of 6 nm, there was applied a 1% aqueous dispersion of a clay mineral, i.e., synthetic smectite particles (available from KUNIMINE Industry under the tradename, SMECTON SA) having a mean particle size of 108 nm, and dried at about 28° C. for 12 hours to produce a phase retarder comprising a triacetyl cellulose film having the synthetic smectite layer of a thickness of 3.8 $\mu$m laminated thereon. The synthetic smectite layer had a difference in refractive index between the direction in the plane and the thickness direction of $1.12 \times 10^{-1}$ and the phase retarder had a very low birefringence as represented by an in-plane retardation of 6 nm.

EXAMPLE 4

A cast polystyrene film having a very low birefringence was obtained by casting in the same procedure as in Example 1. This film was corona-discharged under the same conditions as in Example 1 to achieve a surface tension of 54 dyn/cm or more, and then applied with a 0.65% aqueous dispersion of a clay mineral, i.e., sodium tetrasiliric mica (available from TOPY INDUSTRIES, LTD. under the tradename, Na-Ts) having a mean particle size of 977 nm, and dried at about 28° C. for 12 hours to produce a phase retarder comprising a cast polystyrene film of a very low birefringence having a sodium tetrasiliric mica layer of a thickness of 2.5 $\mu$m laminated thereon. The sodium tetrasiliric mica layer had a difference in refractive index between the direction in the plane and the thickness direction of $2.14 \times 10^{-1}$ and the phase retarder had a very low birefringence in the plane.

EXAMPLE 5

A cast polystyrene film produced in the same procedure as in Example 1 was stretched 2.8 times at 135° C. by tentering to attain a birefringent film having a thickness of 28 $\mu$m and exhibiting $\theta_{1.10}=35°$ with $R_0=503$ nm. This film was corona-discharged under the same conditions as in Example 1 to achieve a surface tension of 54 dyn/cm or more, and then applied with an aqueous dispersion consisting of a 1:1 mixture of a 2% aqueous dispersion of a clay mineral, i.e., synthetic hectorite particles (available from Laporte Co. under the tradename, Laponite XLG) having a mean particle size of 35 nm and a 2% aqueous solution of polyvinylalcohol (available from Wako Pure Chemical Industries, Ltd.) having a degree of polymerization of 500 and a degree of saponification of 98.5%, and then dried at about 28° C. for 30 hours to produce a phase retarder comprising a birefringent polystyrene film having a polyvinylalcohol-containing synthetic hectorite layer of a thickness of 18 $\mu$m laminated thereon. This phase retarder exhibited a wide viewing angle of $\theta_{1.10}=74°$ with $R_0=503$ nm and was very good in film condition.

EXAMPLE 6

To a triacetyl cellulose film having a thickness of 80 $\mu$m (available from Fuji Photo Film Co., Ltd. under the tradename, FUJITACK CLEAR), the surfaces of which were treated by saponification, having an in-plane retardation of 6 nm, there was applied an aqueous dispersion consisting of a 3:7 mixture of a 5% aqueous dispersion of a clay mineral, i.e., synthetic hectorite particles (available from Laporte Co. under the tradename, Laponite XLS) having a mean particle size of 35 nm and a 2.5% aqueous solution of polyvinylalcohol (available from KURARAY CO., LTD.) having a degree of polymerization of 300 and a degree of saponification of 98.5%, and then dried at about 60° C. for one hour to produce a phase retarder comprising a triacetyl cellulose film having a polyvinylalcohol-containing synthetic hectorite layer of a thickness of 12 $\mu$m laminated thereon. The polyvinylalcohol-containing synthetic hectorite layer had a difference in refractive index between the direction in the plane and the thickness direction of $0.18 \times 10^{-1}$ and the phase retarder had a very low birefringence in the plane as represented by an in-plane retardation of 6 nm. This phase retarder was very good in film condition.

EXAMPLE 7

To a non-oriented glass plate, there was applied an aqueous dispersion consisting of a 3:7 mixture of a 2% aqueous dispersion of a clay mineral, i.e., synthetic hectorite particles (available from Laporte Co. under the tradename, Laponite XLS) having a mean particle size of 35 nm and a 1% aqueous solution of polyvinylalcohol (available from KURARAY CO., LTD.) having a degree of polymerization of 1000 and a degree of saponification of 98.5%, and then dried at about 60° C. for one hour to produce a phase retarder comprising the glass plate having a polyvinylalcohol-containing synthetic hectorite layer of a thickness of 8 μm laminated thereon. The polyvinylalcohol-containing synthetic hectorite layer had a difference in refractive index between the direction in the plane and the thickness direction of $0.16 \times 10^{-1}$ and the phase plate had a very low birefringence in the plane. This phase retarder was very good in film condition.

EXAMPLE 8

To a triacetyl cellulose film having a thickness of 80 μm (available from Fuji Photo Film Co., Ltd. under the tradename, FUJITACK CLEAR), the surfaces of which were treated by saponification, having an in-plane retardation of 6 nm, there was applied an aqueous dispersion consisting of a 3:7 mixture of a 1% aqueous dispersion of a clay mineral, i.e., synthetic hectorite particles (available from Laporte Co. under the tradename, Laponite XLS) having a mean particle size of 35 nm and a 0.5% aqueous solution of polyvinylalcohol (available from KURARAY CO., LTD.) having a degree of polymerization of 2400 and a degree of saponification of 98.5%, and then dried at about 60° C. for one hour to produce a phase retarder comprising a triacetyl cellulose film having a polyvinylalcohol-containing synthetic hectorite layer of a thickness of 10 μm laminated thereon. The polyvinylalcohol-containing synthetic hectorite layer had a difference in refractive index between the direction in the plane and the thickness direction of $0.16 \times 10^{-1}$ and the phase retarder had a very low birefringence in the plane as represented by an in-plane retardation of 6 nm. This phase retarder was good in film condition.

EXAMPLE 9

To a releasable polyester film, the surface of which was treated with silicon, there was applied an aqueous dispersion consisting of a 3:7 mixture of a 2% aqueous dispersion of a clay mineral, i.e., synthetic hectorite particles (available from Laporte Co. under the tradename, Laponite XLS) having a mean particle size of 35 nm and a 1% aqueous solution of polyvinylalcohol (available from KURARAY CO., LTD.) having a degree of polymerization of 1000 and a degree of saponification of 88.5%, and then dried at about 60° C. for one hour. A polyvinylalcohol-containing synthetic hectorite layer was easily peeled off so that a phase retarder comprising the polyvinylalcohol-containing synthetic hectorite sheet of a thickness of 15 μm. This phase retarder had a difference in refractive index between the direction in the plane and the thickness direction of $0.17 \times 10^{-1}$ and had a very low birefringence in the plane. This phase retarder was very good in film condition.

EXAMPLE 10

To a triacetyl cellulose film having a thickness of 80 μm (available from Fuji Photo Film Co., Ltd. under the tradename, FUJITACK CLEAR), the surfaces of which were treated by saponification, having an in-plane retardation of 6 nm, there was applied an aqueous dispersion consisting of a 3:7 mixture of a 2% aqueous dispersion of a clay mineral, i.e., synthetic hectorite particles (available from Laporte Co. under the tradename, Laponite XLG) having a mean particle size of 35 nm and a 2% aqueous solution of polyvinylalcohol (available from KURARAY CO., LTD.) having a degree of polymerization of 1000 and a degree of saponification of 88.5%, and then dried at about 28° C. for 30 hours to produce a phase retarder comprising a triacetyl cellulose film having a polyvinylalcohol-containing synthetic hectorite layer of a thickness of 10 μm laminated thereon. The polyvinylalcohol-containing synthetic hectorite layer had a difference in refractive index between the direction in the plane and the thickness direction of $0.17 \times 10^{-1}$ and the phase retarder had a very low birefringence in the plane as represented by an in-plane retardation of 6 nm. This phase plate was very good in film condition.

EXAMPLE 11

A phase retarder was produced in the same procedure as in Example 6, except that the polyvinylalcohol-containing synthetic hectorite layer had a thickness of 2.4 μm.

Then, a 25% solution of polystyrene resin (available from SUMITOMO CHEMICAL CO., LTD.) in dichloroethane was prepared, and cast into a film. This cast film was stretched 2.0 times at 130° C. by tentering to obtain a birefringent film exhibiting $R_0 = 403$ nm, $\theta_{1.10} = 38°$ and having a thickness of 85 μm.

The phase retarder and the birefringent film of polystyrene were stacked by means of a sticking agent with the polyvinylalcohol-containing synthetic hectorite layer being between the triacetyl cellulose film and the birefringent film to produce a phase retarder. This phase retarder exhibited good viewing angle properties as $R_0 = 403$ nm and $\theta_{1.10} = 51°$.

EXAMPLE 12

A phase retarder was produced in the same procedure as in Example 6, except that the polyvinylalcohol-containing synthetic hectorite layer had a thickness of 7.2 μm.

The phase retarder and the same birefringent film of polystyrene as in Example 11 were stacked by means of a sticking agent with the polyvinylalcohol-containing synthetic hectorite layer being between the triacetyl cellulose film and the birefringent film to produce a phase retarder. This phase retarder exhibited good viewing angle properties as $R_0 = 403$ nm and $\theta_{1.10} = 80°$ or more.

COMPARATIVE EXAMPLE 1

A cast polystyrene film obtained in the identical procedure to that in Example 1 was stretched 2.8 times at 135° C. by tentering to produce a phase retarder. This phase retarder exhibited $R_0 = 503$ nm and $\theta_{1.10} = 35°$.

EXAMPLE 13

A triacetyl cellulose film having a thickness of 80 μm (available from Fuji Photo Film Co., Ltd. under the tradename, FUJITACK CLEAR), the surfaces of which were treated by saponification, was used as a substrate film (in-plane retardation: 5.5 nm). Onto the substrate film, there was applied an aqueous dispersion consisting of a 3:7 mixture of a 5.0% aqueous dispersion of a clay mineral, i.e., synthetic hectorite particles (available from Laporte Co. under the tradename, Laponite XLS) having a mean particle size of 35 nm and a 2.5% aqueous solution of polyvinylalcohol (available from KURARAY CO., LTD.) having a degree of saponification of 98.5% and a degree of polymerization of 300 to produce a film having a thickness of 2.4 μm after drying, thereby attaining a phase retarder comprising a triacetyl cellulose film having a polyvinylalcohol-containing synthetic hectorite layer laminated thereon (referred to as Film A hereunder). The polyvinylalcohol-containing synthetic hectorite layer had a difference in refractive index between the direction in the plane and the thickness direction of $0.18 \times 10^{-1}$ and the in-plane retardation of Film A was very low (5.5 nm as determined by measurement with a polarizing microscope).

Furthermore, a cast film was obtained from the polystyrene (available from SUMITOMO CHEMICAL CO., LTD. under the tradename, SUMIBRIGHT E183) in the identical procedure to that in Example 11. The cast film was uniaxially stretched to produce a uniaxially oriented birefringent film having an in-plane retardation of 390 nm as determined by measurement with the polarizing microscope (referred to as Film B) and a uniaxially oriented birefringent film having an in-plane retardation of 406 nm (referred to as Film C).

Using these films, there were prepared a phase retarder 1 by laminating the Film A and the Film B with a sticking agent (Constitution: triacetyl cellulose film-/polyvinylalcohol-containing synthetic hectorite layer/polystyrene film) and a phase retarder 2 by laminating the Film A and the phase Film C with a sticking agent (Constitution: triacetyl cellulose film-/polyvinylalcohol-containing synthetic hectorite layer/polystyrene film).

The STN type liquid crystal display device with an optical compensator film equipped on the word processor available from FUJITSU LTD. under the tradename, OASYS 30LX-401 was modified by removing the optical compensator film therefrom. Then, the phase retarder 1 was interposed between the upper polarizing film and the liquid crystal cell and the phase retarder 2 was interposed between the lower polarizing film and the liquid crystal cell with each triacetyl cellulose layer of both films being on the side of the film remote from the liquid crystal cell. In this way, a STN type LCD was made using as a compensating phase retarders the combination of the phase retarders having the layered inorganic compound layer with the uniaxially oriented birefringent films.

This LCD exhibited less variation in contrast depending upon viewing angle and good viewing angle characteristics. Iso-contrast curves are shown in FIG. 1, in which CR indicates a contrast ratio.

COMPARATIVE EXAMPLE 2

Figure 2:
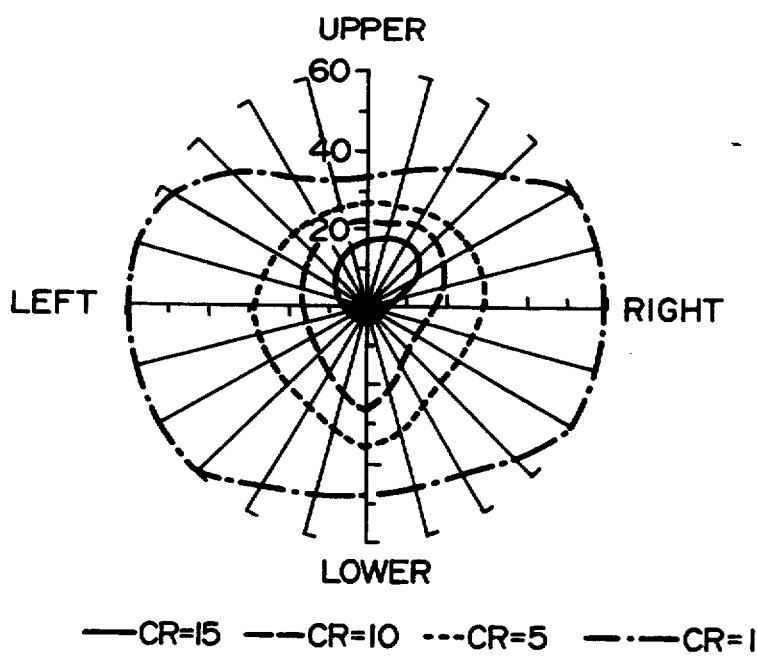
FIG. 2 is a chart showing iso-contrast curves representing the viewing angle characteristics of the liquid crystal display device using the conventional phase retarders.

A liquid crystal display device was constructed in the same manner as in Example 13, except that a phase retarder having an in-plane retardation of 385 nm prepared from a thermoplastic resin having a positive birefringent anisotropy (available from SUMITOMO CHEMICAL CO., LTD. under the tradename, SUMIKALIGHT) was used as Film 1, and that a birefringent film having an in-plane retardation of 408 nm prepared from a thermoplastic resin having a positive birefringent anisotropy (available from SUMITOMO CHEMICAL CO., LTD. under the tradename, SUMIKALIGHT) was used as Film 1. This liquid crystal display device was inferior in viewing angle characteristics especially in the vertical direction viewing angle characteristics, to those of the liquid crystal display device constructed in Example 13. Iso-contrast curves are shown in FIG. 2.

EXAMPLE 14

A triacetyl cellulose film having a thickness of 80 μm (available from Fuji Photo Film Co., Ltd. under the tradename, FUJITACK CLEAR), the surfaces of which were treated by saponification (in-plane retardation 6 nm) was used as a substrate film. Onto the substrate film, there was applied an aqueous dispersion consisting of a 3:7 mixture of a 5.0% aqueous dispersion of a clay mineral, i.e., synthetic hectorite particles (available from Laporte Co. under the tradename, Laponite XLS) having a mean particle size of 35 nm and a 2.5% aqueous solution of polyvinylalcohol (available from KURARAY CO., LTD.) having a degree of polymerization of 300 and a degree of saponification of 98.5%, and then dried to produce a laminate film comprising a triacetyl cellulose film having a polyvinylalcohol-containing synthetic hectorite layer of a thickness of 15 μm.

Using a 1% aqueous solution of polyvinylalcohol (available from KURARAY CO., LTD.) under the tradename, Poval 117) having a degree of polymerization of 1700 and a degree of saponification of 98.5% as an adhesive, a triacetyl cellulose film having a thickness of 80 μm (available from Fuji Photo Film Co., Ltd. under the tradename, FUJITACK CLEAR), the surfaces of which were treated by saponification, and having an in-plane retardation of 6 nm was wet-laminated onto the side of the polyvinylalcohol-containing synthetic hectorite layer, and dried at 80° C. for one hour to obtain a phase retarder (Constitution: triacetyl cellulose film/polyvinylalcohol-containing synthetic hectorite layer/triacetyl cellulose film).

The polyvinylalcohol-containing synthetic hectorite layer had a difference in refractive index between the direction in the plane and the thickness direction of $0.18 \times 10^{-1}$ and the in-plane retardation of the phase film was very low (an in-plane retardation of 12 nm).

This phase film was interposed between the upper polarizing film and the liquid crystal cell of a 3 inch thin film transistor TN liquid crystal color television (available from Matsushita Electric Industrial Co., Ltd. under tradename, PANACRYSTAL TR-3LT1). The display exhibited less variation in contrast with varying viewing angle and better viewing angle properties compared to the case without any phase retarder laminated.

What is claimed is:

1. A liquid crystal display device containing a phase retarder comprising a layered inorganic compound and an optically transparent resin in a ratio by volume of 0.1 to 10, said inorganic compound being a clay mineral having a mean particle size of 5000 nm or less and a stratified structure with a plurality of crystalline layer units and having a refractive index in the plane of the crystalline layer units that is different from a refractive index in the thickness direction of the crystalline layer units, wherein the phase retarder has a refractive index in the plane of the phase retarder that is different from a refractive index in the thickness direction of the phase retarder and has a retardation in the plane of 50 nm or less.

2. A liquid crystal display according to claim 1, wherein said optically transparent resin is a vinylalcohol polymer.

3. A liquid crystal display according to claim 2, wherein said phase retarder is produced by mixing the layered inorganic compound having a mean particle size of 5000 nm or less and having a refractive index in the plane of the crystalline layer units that is different from a refractive index in the thickness direction of the crystalline layer units, which compound has been swollen or dispersed in a solvent, with a solution of the vinylalcohol polymer dissolved to produce a dispersion, and then applying the resulting dispersion and drying it.

4. A liquid crystal display according to claim 1, wherein said phase retarder is produced by mixing the layered inorganic compound having a mean particle size of 5000 nm or less and having a refractive index in the plane of the crystalline layer units that is different from a refractive index in the thickness direction of the crystalline layer units, which compound has been swollen or dispersed in a solvent, with a solution of the optically transparent resin dissolved to produce a dispersion, and then applying the resulting dispersion and drying it.

* * * * *